United States Patent [19]

Oudet

[11] Patent Number: 4,658,166

[45] Date of Patent: Apr. 14, 1987

[54] SYNCHRONOUS ELECTRIC MOTOR WITH DISC-SHAPED PERMANENT MAGNET ROTOR

[75] Inventor: Claude Oudet, Besancon, France

[73] Assignee: Portescap, Chaux-de-fonds, Switzerland

[21] Appl. No.: 860,813

[22] Filed: May 8, 1986

[30] Foreign Application Priority Data

May 10, 1985 [CH] Switzerland .................. 1999/85

[51] Int. Cl.⁴ .......................................... H02K 21/12
[52] U.S. Cl. .................................. 310/156; 310/162; 310/268
[58] Field of Search ..................... 310/156, 162–165, 310/168, 268, 46, 49

[56] References Cited

U.S. PATENT DOCUMENTS

| | | | |
|---|---|---|---|
| 3,396,296 | 8/1968 | Esters | 310/46 X |
| 3,603,823 | 9/1971 | Mason | 310/46 |
| 3,700,943 | 10/1972 | Heintz | 310/168 |
| 3,700,944 | 10/1972 | Heintz | 310/168 |
| 4,330,727 | 5/1982 | Oudet | 310/268 |
| 4,334,166 | 6/1982 | Miyahara et al. | 310/268 |
| 4,477,745 | 10/1984 | Lux | 310/156 |
| 4,517,478 | 5/1985 | Oudet | 310/268 X |

*Primary Examiner*—Donovan F. Duggan
*Attorney, Agent, or Firm*—Cushman, Darby & Cushman

[57] ABSTRACT

The present invention relates to a synchronous electric motor of the type comprising at least one rotor part, substantially of annular disc form, magnetized so as to present on at least one of its opposite planar surfaces at least one series of magnetic poles of alternating polarities, disposed regularly along at least one annular zone, said rotor part being mounted on a rotatable shaft, the motor additionally comprising at least one assembly of several elementary magnetic circuits of a magnetically permeable material and at least one annular electric energizing coil coupled with said assembly of magnetic circuits, each of said circuits having at least one air-gap, and all of said air-gaps being arranged for cooperating with the said magnetic poles of an annular zone of said rotor part, each of said elementary magnetic circuits comprising at least two rectangular and essentially flat pole parts, which are arranged substantially radially with respect to said shaft of the rotor.

11 Claims, 9 Drawing Figures

SYNCHRONOUS ELECTRIC MOTOR WITH DISC-SHAPED PERMANENT MAGNET ROTOR

Such a motor is described, for example, in U.S. Pat. No. 4,330,727. The original conception of this motor is adapted to motors of relatively small dimensions and of a power substantially smaller than 1 kilowatt. For motors having larger dimensions the structure as originally provided appeared not to offer an optimal relationship between the torque produced and the size of the motor, especially as regards its radial dimension.

The main object of the present invention is to provide a motor of the mentioned type which provides a high torque and a large number of steps per revolution, while having a minimum radial dimension.

To this effect, the motor according to the invention has two pole parts of each of said magnetic circuits arranged at different radial distances on a same side of said magnetised rotor part, each elementary magnetic circuit thus presenting two radially spaced air-gaps and co-operating with two concentric annular zones of said magnetised rotor part, and said electrical energizing coil being inserted into the space formed between said pole parts of the magnetic circuits with which it is coupled.

In a preferred embodiment of the invention, the rotor part is magnetised axially so as to present at least one series of magnetic poles on each of its planar surfaces and each elementary magnetic circuit comprises four pole parts, disposed in pairs on both sides of said rotor part so as to form two air-gaps at different radial distances, one energizing coil and a yoke member being arranged on each side of the rotor part.

In an alternative embodiment, at least three pole parts are located at different radial distances on a same side of said rotor part, connected in pairs by at least one yoke member and coupled with at least two concentric annular energizing coils of different diameters which each pass between two pole parts, these latter forming part of at least two elementary magnetic circuits co-operating with the magnetic poles of at least three concentric annular zones of said magnetised rotor part.

According to the invention, a magnetic circuit closing part can be provided on one side of the rotor part opposite the pole parts located on the other side of the rotor part and, in particular, said circuit closing part can be fast with the rotor part.

Other features and advantages of the invention will become apparent from the following description of different embodiments, with reference to the accompanying drawing, wherein.

Figure 1:
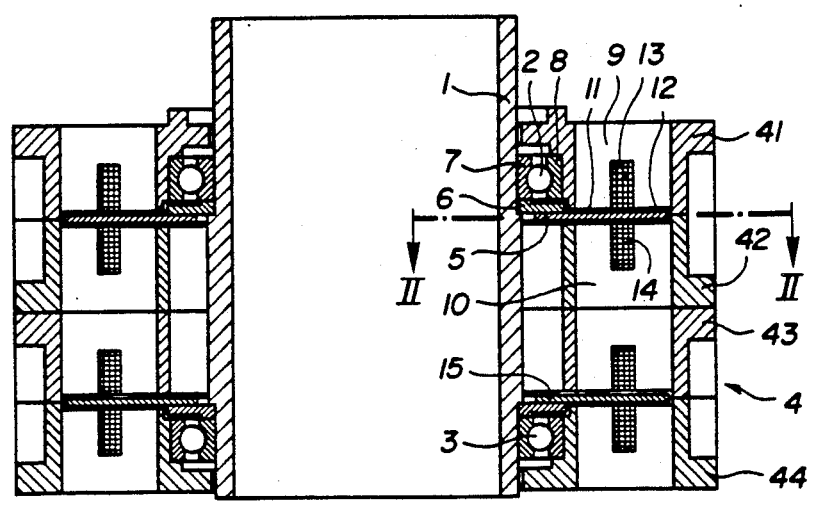
FIG. 1 is an axial section of a first embodiment of the motor according to the invention.
Figure 2:
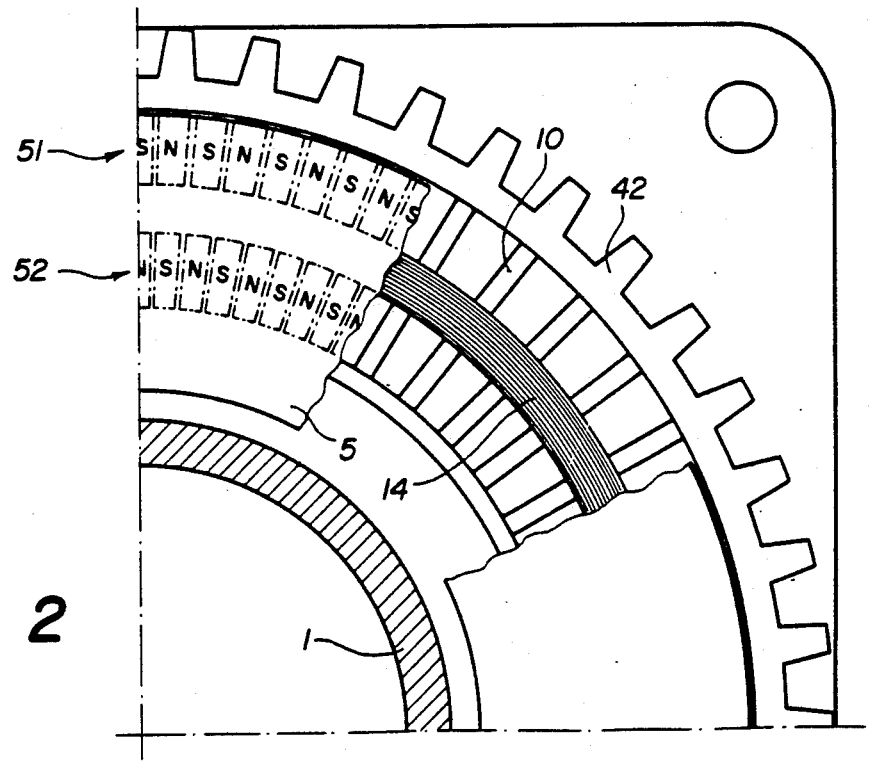
FIG. 2 is a sectional view on the line II—II of FIG. 1 and to a larger scale.

The motor shown in FIGS. 1 and 2 comprises a shaft 1 which, in this case, is a hollow shaft having a diameter which is relatively large in relation to the radial dimensions of the motor. The shaft 1 is mounted to be rotatable, by means of ball bearings 2, 3, in a stator assembly 4 which is formed of two sub-assemblies comprising, respectively, parts 41, 42 and 43, 44, which are, for example, made of aluminum or a synthetic plastics material.

A first annular disc 5, of a magnetisable material such as samarium-cobalt, is mounted by means of an annular support element 6 on the inner race 7 of the ball bearing 2, this race being fast with the shaft 1. The outer race 8 of the bearing 2 is mounted on the part 41 of the stator. This part 41 comprises notches or slots in the radial direction of the motor, in which are placed flat U-shaped parts 9, made of a material having very good magnetic permeability. A second series of such U-shaped parts, indicated at 10, is placed in corresponding slots of the part 42 of the same stator sub-assembly. The two arms of each "U" form pole parts, of which the free ends present polar surfaces, the polar surfaces of one pair of parts 9, 10 being disposed facing one another, so as to form air-gaps 11, 12. Coaxial, annular electric energizing coils 13, 14 are disposed in such manner as to be inserted into the space formed between the arms of the U-shaped members 9 and 10, respectively. Each pair of parts 9, 10 constitutes an elementary magnetic circuit comprising two air-gaps and being coupled with the two coils 13 and 14.

The annular disc 5 is magnetised in its axial direction, so as to provide magnetic poles of alternate polarity, i.e. N and S, on each of its surfaces, these poles being distributed substantially regularly along two concentric annular zones 51, 52, which are indicated in FIG. 2. In this Figure, the N and S poles have been indicated by chain-dotted lines. The dimensions of these poles are substantially equal to those of the pole surfaces formed by the ends of the arms of the U-shaped members 9 and 10, the radial distances of the two zones 51 and 52 corresponding to the radial distances of the air-gaps 11 and 12 formed by the parts 9 and 10.

Since the poles of the magnetised annular disc are distributed substantially regularly along each zone, the angular spacing of the median lines of the poles is substantially $\pi/N$ for a number of poles of $2N$ appearing in each of the zones 51 and 52 on a same face of the disc. The mean angular spacing of the axial median planes of the elementary magnetic circuits 10 is $\pi/N$. The actual spacing between two adjoining circuits may be slightly different from this mean value, in order to compensate for the influence of certain harmonics of the torque of the motor.

The magnetic poles appearing at the pole surfaces of a member 9 or 10 under the effect of the current in the coils 13 and 14, being differently named on a same side of the magnetised disc, the magnetic poles of the magnetised disc disposed on a same side of this disc and having the same median line are also differently named.

In other words, the poles of same name to be found in one or other of the two concentric zones 51 and 52, on a same face of the disc, are offset by $\pi/N$ relatively to one another, as will be seen in FIG. 2.

The motor shown in FIG. 1 is a two-stage motor, the first stage comprising the magnetised disc 5 and the second stage, which is in fact similar, comprising a magnetised disc 15, this latter co-operating with the sub-assembly of stators comprising the previously mentioned parts 43 and 44. The structure of the second stage is similar to that which has just been described in relation to the first. Each stage thus constitutes, for example, one phase of a two-phase motor.

It is to be noted that the form of the elementary magnetic circuits, such as described above, permits the use, for a given external diameter of the motor, of a magnetised disc of maximal diameter, and also the use of large magnetised zones on this disc. As a consequence, the efficiency and the output reach very high values for a given size.

Figure 3:
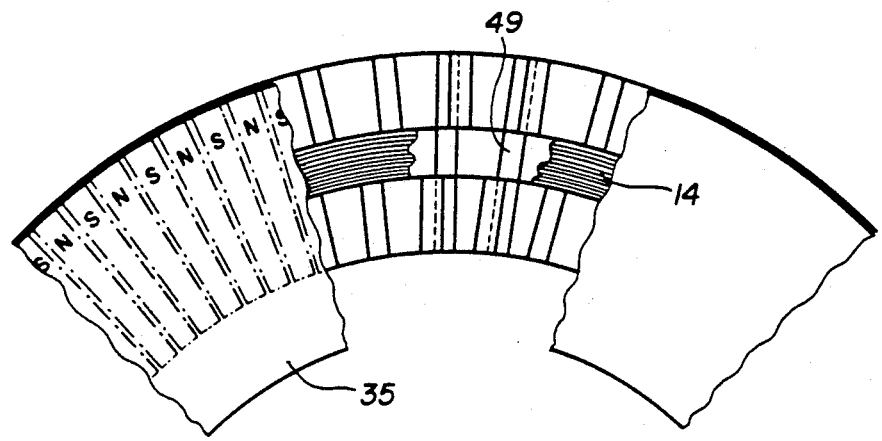
FIG. 3 is a partial sectional view, similar to a part of FIG. 2, of a first modified form of the motor shown in FIG. 1.
Figure 4:
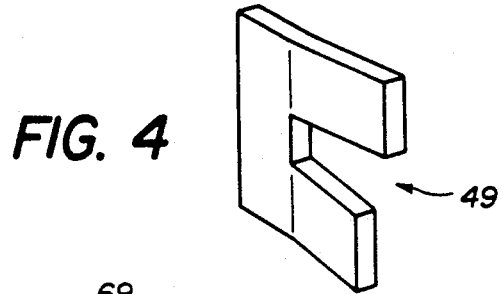
FIG. 4 is a perspective view of a "U"-shaped part of an elementary magnetic circuit which is used in the motor according to FIG. 3.
Figure 5:
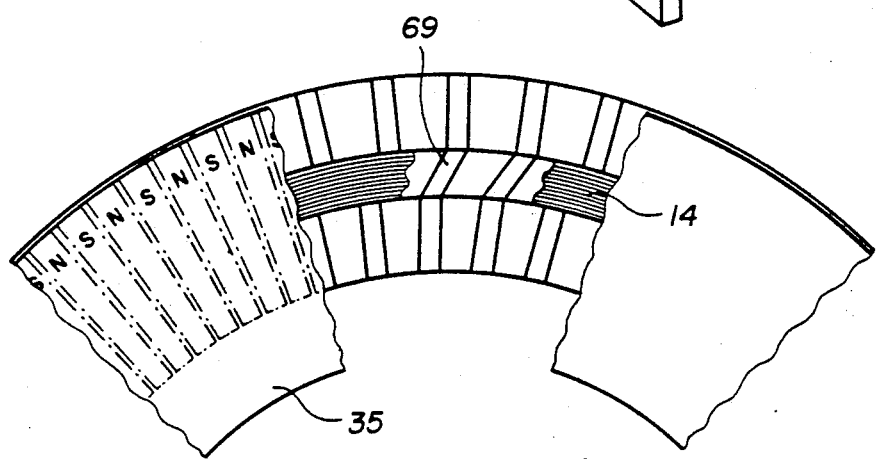
FIG. 5 is a partial sectional view, similar to that of FIG. 3, in respect of a second modified form of the motor shown in FIG. 1.
Figure 6:
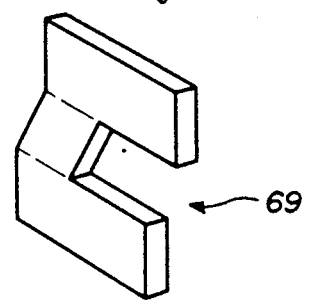
FIG. 6 is a perspective view, similar to that of FIG. 4, of a U-shaped part which is used in the modified form of the motor according to FIG. 5.

FIGS. 3 and 4, on the one hand, and FIGS. 5 and 6, on the other hand, illustrate modified embodiments of the motor shown in FIG. 1, in which modified embodiments the poles appearing on each face of the magnetised disc 35 are of the same name in the same angular sector of the disc. It is therefore necessary to provide for an angular offsetting between the pole parts of each U-shaped member, such as 49 in FIG. 4 and 69 in FIG. 6. In the embodiment according to FIG. 4, the two pole parts are bent from a straight-based portion, so as to form an angle relatively to the latter and between them, in the radial direction. According to FIG. 6, the two pole parts are parallel to one another, and it is the base portion of the member 69 which is bent, so as to provide the offsetting of the two pole parts. In both cases, the magnetisation of the disc 35 is simplified because of the alignment and the continuity of the poles between the two annular zones co-operating with the pole surfaces of the U-shaped members.

Figure 7:
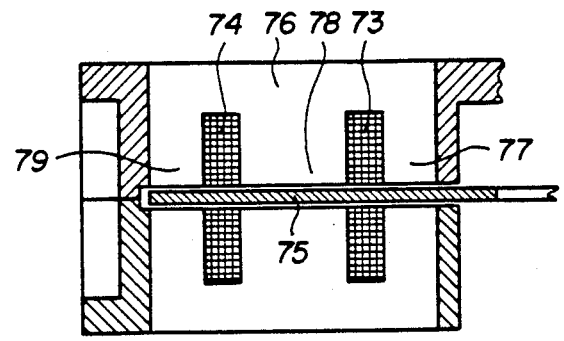
FIG. 7 is a partial sectional view, similar to a part of FIG. 1, showing another embodiment of an elementary magnetic circuit.

FIG. 7 represents another embodiment of the elementary magnetic circuit, according to which three pole parts, such as 77, 78, 79, are disposed on each side of a magnetised disc 75, these three pole parts being connected to one another by a common yoke portion 76. Two coaxial annular coils 73, 74 are coupled with the W-shaped parts thus formed on each side of the disc 75. This latter has three concentric annular magnetised zones on each of its faces, the poles formed in each angular sector being of same polarity in the exterior and interior zones, and being of opposite polarities in the middle zone, in conformity with the succession of the poles appearing on the pole surfaces of the parts 77, 78 and 79. The coils 73 abd 74 are, of course, supplied in such manner that the same polarity appears on the common pole part 78.

The advantage of the constructional form in FIG. 7 is a substantial increase in the torque of the motor by means of a relatively small increase in the radial dimension of the latter.

Figure 8:
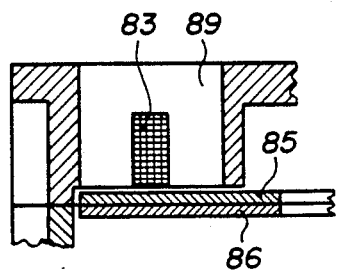
FIG. 8 is a partial sectional view, similar to that of FIG. 1, corresponding to another constructional form of the motor.

FIG. 8 illustrates a constructional form, of which the aim is to provide a particularly flat motor. In this case, the elementary magnetic circuits are formed by a single U-shaped part 89, which is arranged in a manner similar to that shown in FIG. 1 and is coupled with a similar annular coil 83, the closing of the circuit being achieved by a yoke member placed on the opposite side of the magnetised disc 85. In the example of FIG. 8, this yoke member 86 is fast with the magnetised disc, but it could also be fixed and spaced from the disc 85, like the part 10 of FIG. 1.

Figure 9:
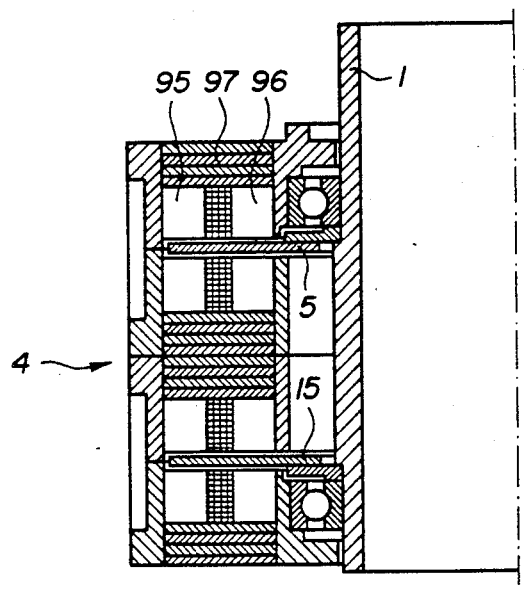
FIG. 9 is a sectional view, similar to that of FIG. 1, showing an alternative embodiment of the motor shown in FIG. 1.

A structure similar to that of FIG. 1 is shown in FIG. 9, in which the same elements have been given the same reference numerals as in FIG. 1. In this structure, the pole parts of the elementary magnetic circuits, such as 95, 96, are interconnected by a common annular yoke part, formed for example by a laminated assembly, such as 97 in FIG. 9. Such an embodiment is of particular interest, from the point of view of the manufacturing of the parts and the assembling of the motor.

I claim:

1. A synchronous electric motor, comprising at least one rotor part, substantially of annular disc form, magnetised so as to present on at least one of its opposite planar surfaces at least one series of magnetic poles of alternating polarities, disposed regularly along at least one annular zone, said rotor part being mounted on a rotatable shaft, the motor additionally comprising at least one assembly of several elementary magnetic circuits of a magnetically permeable material and at least one annular electric energizing coil coupled with said assembly of magnetic circuits, each of said circuits having at least one air-gap, and all of said air-gaps being arranged for co-operating with the said magnetic poles of an annular zone of said rotor part, each of said elementary magnetic circuits comprising at least two rectangular and essentially flat pole parts, which are arranged substantially radially with respect to said shaft of the rotor, two pole parts of each magnetic circuit being arranged at different radial distances on a same side of said magnetised rotor part, each elementary magnetic circuit thus presenting two radially spaced air-gaps and co-operating with two concentric annular zones of said magnetised rotor part, and said electrical energizing coil being inserted into the space formed between said pole parts of the magnetic circuits with which it is coupled.

2. A motor according to claim 1, comprising a rotor part magnetised axially so as to present at least one series of magnetic poles on each of its planar surfaces, wherein each elementary magnetic circuit comprises four pole parts, disposed in pairs on both sides of said rotor part so as to form two air-gaps at different radial distances, one energizing coil and a yoke member being arranged on each side of the rotor part.

3. A motor according to claim 1, comprising at least three pole parts located at different radial distances on a same side of said rotor part, connected in pairs by at least one yoke member and coupled with at least two concentric annular energizing coils of different diamters which each pass between two poles parts, these latter forming part of at least two elementary magnetic circuits co-operating with the magnetic poles of at least three concentric annular zones of said magnetised rotor part.

4. A motor according to claim 3, comprising a rotor part magnetised axially so as to present, on each of its planar surfaces, at least one series of magnetic poles, and comprising pole parts disposed in pairs on both sides of said rotor part, so as to form an air-gap co-operating with a corresponding annular zone of said rotor part, said yoke members and said annular coils being arranged on each side of the rotor part.

5. A motor according to one of claims 1 or 3, wherein each elementary magnetic circuit comprises, on one side of the rotor part, a circuit-closing part which is arranged opposite the pole parts located on the other side of said rotor part.

6. A motor according to one of claims 1 or 3, wherein each elementary magnetic circuit comprises, on one side of the rotor part, a circuit-closing part which is arranged opposite the pole parts located on the other side of said rotor part, wherein said rotor part is magnetised axially so as to present at least one series of magnetic poles on each of its planar surfaces, and wherein said circuit-closing part is fast with the rotor part.

7. A motor according to claim 1, wherein said two pole parts of an elementary magnetic circuit, located at different radial distances on a same side of said rotor part, have a same axial plane of symmetry, the magnetic poles of same name or sign, respectively situated in one and the other of the said concentric annular zones of said rotor part being offset relatively to one another by an angle substantially equal to $\pi/N$, if 2N is the number of alternate positive and negative poles of an annular zone.

8. A motor according to claim 1, wherein said two pole parts of an elementary magnetic circuit, located at different radial distances on a same side of said rotor part have axial planes of symmetry which are respectively offset by an angle which is substantially equal to $\pi/N$, if 2N is the number of alternate positive and negative poles of an annular zone of said rotor part, pairs of poles of the same sign of respective concentric annular zones being substantially aligned radially.

9. A motor according to claim 2, wherein said yoke member is formed by an annular part which is common to the pole parts disposed on a same side of said rotor part.

10. A motor according to claim 8, wherein said two pole parts and a corresponding yoke member are formed by a substantially flat U-shaped member, the two arms of the "U" forming the pole parts being bent in relation to the yoke member for achieving the offsetting of their planes of symmetry.

11. A motor according to claim 8, wherein said two pole parts and a corresponding yoke member are formed by a substantially flat U-shaped member, the yoke member being bent in order to effect the offsetting of the two pole parts formed by the arms of the "U".

* * * * *